United States Patent Office 3,687,852
Patented Aug. 29, 1972

3,687,852
AUTOMATIC TRANSMISSION FLUID AND METHOD
Arthur William Godfrey, Fishkill, Peter Dorn, Lagrangeville, and Wheeler C. Crawford, Fishkill, N.Y., assignors to Texaco Inc., New York, N.Y.
No Drawing. Filed Dec. 17, 1970, Ser. No. 99,284
Int. Cl. C09k 3/00; C10m 1/32
U.S. Cl. 252—77                 8 Claims

ABSTRACT OF THE DISCLOSURE

Automatic transmission fluid composition comprising at least 86 weight percent of a mineral lubricating oil, from 0.1 to 5 weight percent of an ashless dispersant and from 0.01 to 5 weight percent of a substituted aspartamide represented by the formula:

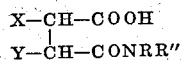

in which X and Y alternately represent hydrogen and the radical R'R''N—, R and R' each represent an aliphatic hydrocarbon radical having from about 1 to 30 carbon atoms, and R'' is hydrogen or an aliphatic hydrocarbon radical having from 1 to 30 carbon atoms and a method of operating an automatic transmission having friction sensitive power transmitting means on a composition comprising a mineral oil and the above-described substituted aspartamide.

BACKGROUND OF THE INVENTION

Field of the invention

The demands for improved performance of automatic transmission fluids spurs a constant search for new additives and lubricating oil formulations to achieve the desired goals. An automatic transmission is a complex hydraulic mechanism having friction sensitive power transmitting means which incorporates the functions of a torque converter, wet clutches and planetary gearing in a relatively compact sealed unit. This device requires a transmission fluid which provides lubricity, extreme pressure and dispersant properties as well as carefully selected frictional properties. In addition, the fluid must not be corrosive to copper alloys or in any way deleterious to the synthetic seals in the transmission. An important requirement for the fluid is that it maintain good lubricity and friction modifying properties under the prolonged high-shear, high temperature conditions encountered in this environment.

Carboxylic acids or their derivatives are widely employed as lubricity agents or friction modifiers in mineral oil based automatic transmission fluids. These lubricity agents provide commercial automatic transmission fluids having a useful service life. The lubricants, however, have limitations in stability which shortens their useful life. This is indicated by a rising coefficient friction in the fluid and by the early onset of erratic or harsh shifting in service and in automatic transmission tests. Automobile manufacturers and lubricating oil formulators have been particularly interested in trying to overcome the unsatisfactory properties of current automatic transmission fluids.

DESCRIPTION OF THE PRIOR ART

U.S. Pat. No. 2,977,309 discloses a mineral lubricating oil composition containing a branched-chain alkylamine derivative of a dicarboxylic acid. This lubricating oil composition exhibits rust inhibiting properties when employed as a steam turbine oil.

SUMMARY OF THE INVENTION

The novel automatic transmission fluid of the invention comprises at least 86 weight percent of a mineral lubricating oil, from about 0.1 to 5 weight percent of an ashless dispersant and from about 0.01 to 5 weight percent of a substituted aspartamide represented by the formula:

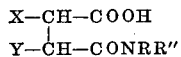

in which X and Y alternately represent hydrogen and the radical R'R''N—, R and R' each represent an aliphatic hydrocarbon radical having from about 1 to 30 carbon atoms and R'' is hydrogen or an aliphatic hydrocarbon radical having from 1 to 30 carbon atoms.

The novel method of the invention involves operating an automatic transmission having friction sensitive power transmitting means by supplying to the mechanism the above described transmission fluid.

SPECIFIC EMBODIMENTS OF THE INVENTION

In a more specific embodiment of the invention, the automatic transmission fluid will comprise at least 86 weight percent of a mineral lubricating oil, from about 0.1 to 5 weight percent of an ashless dispersant comprising the reaction product of a succinic compound and a polyalkylene polyamine, said succinic compound having the formula:

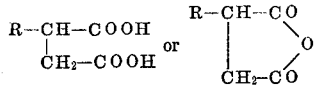

in which R is an aliphatic hydrocarbon radical having from about 50 to 200 carbon atoms or alkenyl radical derived from a polyolefin having a molecular weight from about 500 to 5000 and said polyalkylene polyamine has the formula:

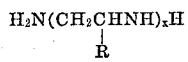

in which R is hydrogen or an alkyl radical having from 1 to 2 carbon atoms and $x$ is an integer from 2 to 6, said reaction being conducted employing succinic compound to polyalkylene polyamine mole ratios ranging from about 0.75:1 to 2.25:1 and from about 0.01 to 5 weight percent of the above described substituted aspartamide. Similarly, a more specific embodiment of the method of the invention will incorporate the ashless dispersant described above in the fluid composition.

The substituted aspartamide useful in the present invention and described in the formula above includes those in which R and R' are aliphatic hydrocarbon radicals having from about 1 to 30 carbon atoms and preferably from about 1 to 20 carbon atoms, and R'' is hydrogen or aliphatic hydrocarbon radical having 1 to 30 carbon atoms. The aliphatic hydrocarbon radicals must be straight chain hydrocarbon radicals although they may be attached to the amine nitrogen at a primary or secondary carbon atom. The most preferred aspartamides are those in which R'' is hydrogen and R and R' are aliphatic hydrocarbon radicals having from 8 to 20 carbon atoms. Minor amounts of the corresponding imide or amine salt of maleiamic acid may be present in the aspartamide. The radicals represented by X and Y in the formula may interchange their positions as indicated.

The substituted aspartamide can be prepared by reacting a mole of maleic acid or maleic anhydride with approximately two moles of a suitable aliphatic amine or a mixture of aliphatic amines under known reaction conditions to form the prescribed substituted aspartamide.

Amines which are suitable for preparing substituted aspartic acid monoamides according to the foregoing process include the primary and secondary alkyl primary and secondary amines in which the alkyl radicals correspond to those on the substituted aspartamide, i.e. having straight chain alkyl radicals. Primary and secondary laurylamine, tetradecylamine, hexadecylamine, stearylamine, nondecylamine, decylamine, as well as amines derived from naturally occurring substances, such as coco, soya and tallow commercially marketed as Armeen 0, Armeen L-11, Armeen L-15 and Armeen 12-D are particularly effective for the present invention.

Specific examples of effective substituted aspartamides include N,N'-dioleyl aspartamide, N,N'-di-n-lauryl aspartamide, N,N'-di(-$C_{10}$-$C_{14}$ sec. alkyl.) aspartamide, N,N'-di(-$C_{14}$-$C_{20}$ sec. alkyl) aspartamide, N,N'-di(-$C_{11}$ sec. alkyl) aspartamide, N,N'-dicoco aspartamide, N,N,N'N'-tetrasoya aspartamide, N,N,N'N'-tetracoco aspartamide and N,N'-ditallow aspartamide.

The following examples illustrate the preparation of substituted aspartamides for the present invention.

Example I.—861 parts by weight of maleic anhydride were slurried in 500 parts of benzene and heated to reflux. 430 parts of a $C_{14}$-$C_{20}$ sec. alkyl-primary amine (Armour Armeen L-15) was slowly added to the refluxing mixture with stirring. The mixture was cooled to 55-60° C. and an additional 430 parts of $C_{14}$-$C_{20}$ sec. alkyl-primary amine added. The total mixture was refluxed for 5 hours followed by removal of the benzene by distillation at 80° C. under 25 mm. Hg. The residue was filtered at 60-70° C. through an ST-3 pad. Inflared, Total Acid Number, Total Base Number and Neutralization Number indicated that the conversion and yield to N,N'-di-($C_{14}$-$C_{20}$-sec. alkyl) aspartamide was approximately quantitative.

Example II.—The reaction of Example I was repeated except that approximately 1,721 parts of a refined mineral oil having an SUS viscosity at 100° F. of about 100 was added to the benzene maleic anhydride slurry. The final substituted aspartamide was obtained as a solution in mineral oil.

Example III.—The procedure of Example I was followed except that the alkylamine employed was n-dodecylamine (Armeen 12-D or laurylamine). Analysis indicated the product to be N,N'-di-(n-dodecyl) aspartamide.

Example IV.—The procedure of Example I was followed except that the alkylamine employed was oleylamine (Armour Armeen 0D). Analysis indicated the product to be N,N'-di-(oleyl) aspartamide.

Example V.—Similar substituted aspartamides were prepared following the procedure of Examples I and II employing (Kemamine 997D) approx. $C_{11}$ sec. alkyl-primary amine, (Armeen L-11) $C_{10}$-$C_{14}$ sec. alkyl-primary amine, di-soya-alkyl sec. amine (Armeen 2S), and di-coco-alkyl sec. amine (Armeen 2C).

The automatic transmission fluid of the invention will generally be a fully formulated fluid containing minor amounts of conventional additives. For example, the automatic transmission fluid can contain from about 0.5 to 8.0 weight percent of a polymer of mixed alkyl esters of methacrylic acid having above 25,000 molecular weight, 0.25 to 5.0 weight percent of a reaction product of a polyalkylene polyamine and an alkenyl succinic acid described above, 0.1 to 5 weight percent of a zinc dialkyl dithiophosphate and from about 0.1 to 2.5 weight percent of an aryl-substituted alpha naphthylamine. The automatic transmission fluid of the invention is generally characterized by an SUS viscosity at 210° F. of 49 to 60, a viscosity index of at least 150 and a pour point below −40° F. and meets the essential Dexron specifications set by General Motors for automatic transmission fluids.

The mineral lubricating oil which constitutes at least 86 weight percent of the composition of the invention is a refined oil or a mixture of refined oils selected according to the viscosity requirements of the particular service. For automatic transmissions where the requirements include an SUS viscosity of the compounded oil at 210° F. of 49 minimum up to 60 and at 0° F. of 7,000 maximum (extrapolated), the base oil or the major component thereof is generally a distillate oil lighter than SAE-10 grade motor oil, such as one having an SUS viscosity at 100° F. less than 150 and generally between about 50 and 125. The distillate fraction can be a refined paraffinic distillate, a refined naphthenic distillate or a combination thereof. The flash point of the distillate component of the base oil will generally be substantially above 300° F.; if the distillate fraction constitutes the entire base oil, its flash point will usually be above 375° F.

A particularly preferred base oil comprises approximately 70 to 95 percent of a refined distillate oil and 5 to 30 percent of a refined residual fraction which imparts desired high flash point and lubricity to the base oil. A particularly preferred residual fraction comprises a paraffin base residuum which has been propane deasphalted and subjected to centrifuge dewaxing and which has an SUS at 210° F. below about 250. An effective base oil mixture comprises 68 percent of a furfural refined, acid treated, clay contacted, solvent dewaxed, paraffin base distillate having an SUS at 100° F. of 100, a viscosity index about 100, a flash above 385° F. and a pour below about +10° F., 22% of an acid-treated naphthenic base distillate having an SUS at 100° F. of 60, a flash above 300° F., and a pour below −40° F., and 10% of a paraffin base residuum which has been propane deasphalted, centrifuged-dewaxed, and clay-contacted, and has an SUS viscosity at 210° F. of about 160 a flash above 530° F. and a pour of +5° F.

A surprising feature of the mineral lubricating oil composition of the invention is that it exhibits a marked reduction in friction between transmission clutch plates as the sliding speed approaches zero, a highly desirable feature for an automatic transmission flud.

A relatively minor amount of a substituted aspartamide in combination with an ashless dispersant in a suitable lubricating oil is effective to provide an outstanding automatic transmission fluid. The preferred concentration of the substituted aspartic acid monoamide is from 0.05 to 0.5 weight percent.

Viscosity index improvement of the fully formulated automatic transmission fluid of the invention is effected with a methacrylate ester polymer having the formula:

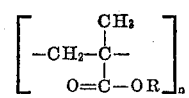

wherein R is an alkyl group, a dialkyl aminoalkyl group or a mixture of such groups containing from 1 to 20 carbon atoms and $n$ is a member providing a molecular weight of the polymer in the range from 25,000 to 1,250,000 and preferably from 35,000 to 200,000. Methacrylate ester polymers possessing pour depressant and viscosity index improving properties are well-known, see U.S. 2,737,496. A very effective material of this type is a copolymer of the lower $C_4$-$C_{14}$ alkyl methacrylate esters. A commercial methacrylate copolymer of this type which is primarily a viscosity index improver corresponds to the formula in which R represents about 32 percent lauryl, 28 percent butyl, 26 percent stearyl and 14 percent hexyl groups and having a molecular weight about 50,000. The methacrylate ester copolymer is employed in the base oil in a proportion ranging from about 0.5 to 10 percent by weight preferably from 1.0 to 5.0 weight percent based upon the oil composition in order to impart the desired viscosity, viscosity index and pour point. It is understood that other methacrylate ester polymers of the foregoing type can be employed.

A dispersant, preferably an ashless dispersant, is generally present in the automatic transmission fluid. An effective dispersant comprises a composition resulting from mixing a substituted succinic compound, selected from the class consisting of substituted succinic acids having the formula:

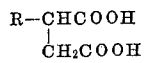

and substituted succinic anhydrides having the formula:

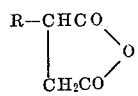

in which R is a arge substantially aliphatic hydrocarbon radical having from about 50 to 200 carbon atoms with at least about one-half of a molar equivalent amount of a polyethylene polyamine and, in the case of the acid, heating the resultant mixture to effect acylation and remove the water formed thereby. The anhydride, however, may react without external heating and hence may be heated only if further reactions of the intermediate amic acid are desired. Suitable amines are diethylene triamine, triethylene tetramine, tetraethylene pentamine and aminoalkylated heterocyclic compounds. The reaction involves amidation of a dicarboxylic acid or anhydride thereof with a polymer to produce amino-substituted acyclic diamides, amic acids, polymeric amides, or a combination of these types of products. It will be noted that the amide groups may further react to form imide groups in the process.

Equivalents here means that a minimum of one-half mole of alkenylsuccinic anhydride or acid per mole of amine is required. This would be the least amount of acid which could react with all of the amine added (via amic acid or acyclic polyamide formation). The maximum amount of acid or anhydride possible to react is one-half mole per primary or secondary amino group. Generally, one or two moles of acid or anhydride per mole of amine, regardless of the total number of nitrogen atoms, is preferred. The reaction product is effective in amounts ranging from about 0.25 to 5.0 weight percent. Methods for preparing the polyethylene polyamine reaction products are well-known and have been described in U.S. 3,131,150 and 3,172,892.

An amine anti-oxidant is important in this fully formulated transmission fluid. Effective anti-oxidants are the aryl-substituted amine anti-oxidants exemplified by the phenyl naphthyl amines, see U.S. 3,414,618 as well as such compounds as phenylene diamine, phenothiazine and diphenylamine. A particularly preferred anti-oxidant is phenyl alpha naphthylamine. The anti-oxidants are effective in a concentration ranging from about 0.1 to 2.5 weight percent.

A zinc dialkyl dithiophosphate or a compound of this type is a valuable component of a fully formulated automatic transmission fluid. A preferred compound of this class is represented by the formula:

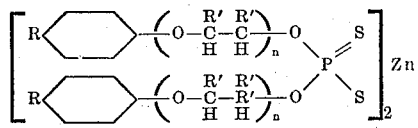

In which R represents an aliphatic radical having from 6 to 15 carbon atoms, R' is hydrogen or an alkyl radical having from 1 to 4 carbon atoms and n is an integer from 1 to 10. Particularly effective compounds in this class are the zinc di(nonylphenoxyethyl) dithiophosphate, zinc di (dodecylphenoxy-ethyl) dithiophosphate and zinc di-(nonylphenoxy-ethoxyethyl) dithiophosphate. Zinc di-(nonylphenoxyethyl) dithiophosphate is prepared by reacting a nonylphenolethylene oxide compound with phosphorus pentasulfide followed by neutralization of the acid formed with a basic zinc compound, such as zinc carbonate, zinc oxide or zinc hydroxide. The general preparation of the compounds in this class is disclosed in U.S. 2,344,395 and 3,293,181. In use, it is convenient to prepare a mineral oil solution of the zinc di($C_{6-15}$ alkylphenoxypolyalkoxyalkyl) dithiophosphate containing from 50 to 75 weight percent of the zinc salt. The salts are effective oxidation and corrosion inhibitors for automatic transmission fluids when employed in a concentration ranging from about 0.1 to 5.0 weight percent based on the hydraulic fluid.

Anti-foam agents are conventionally employed in hydraulic fluids because the fluids are rapidly circulated in operation and air can be entrapped. For this purpose, a silicone fluid of high viscosity, such as a dimethyl silicone polymer having a kinematic viscosity at 25° C. of about 1000 centistokes and above is preferably employed. A very satisfactory anti-foam agent for this purpose is prepared by diluting 10 grams of a dimethyl silicone polymer (1000 centistokes at 25° C.) with kerosene to provide a solution of 100 cubic centimeters. From 0.005 to 0.025 percent by weight of this concentrate is generally employed in the hydraulic fluid to provide from 50 to 200 parts per million of the silicone polymer based on the hydraulic fluid composition.

A preferred mineral base oil blend for preparing a lubricating oil composition for automatic transmission service will comprise 65 percent of a furfural-refined, acid-treated, clay-contacted, solvent dewaxed, paraffin base distillate having an SUS at 100° F. of 100; a viscosity index about 100, a flash above 385° F. and a pour below +10° F., 22 percent of an acid-treated naphthenic base distillate having an SUS at 100° F. of 60, a flash above 300° F. and a pour below —40° F. and 13 percent of a paraffin base residuum which has been propane-deasphalted, solvent dewaxed and clay contacted and which had an SUS viscosity at 210° F. of 160, a flash of about 540° F. and a pour below 5° F. This base oil blend had a flash above 375° F., a pour below 0° F. and a viscosity index of about 93.

In its broadest aspects the automatic transmission fluid of the invention will comprise a major proportion of a suitable mineral lubricating oil base, 0.25 to 5.0 weight percent of the reaction product of a polyalkylene polyamine described herein and 0.01 to 5 weight percent of the prescribed substituted aspartamide.

A preferred fully formulated automatic transmission fluid will comprise a base oil blend as described above and will contain from about 0.5 to 8 weight percent of an oil concentrate containing about 35% of a basic amino nitrogen-containing addition type copolymer comprising copolymers of butyl, lauryl, stearyl and dimethyl aminoethyl methacrylates in approximately 21:53:22:4 weight ratios (as described in U.S. 2,737,496); about 0.25 to 5.0 weight percent of an oil concentrate containing about 33% of the reaction product of approximately 1:1 mole ratio of tetraethylene pentamine and alkenyl succinic anhydride in which the alkenyl radical is polybutene of approximately 1200 average molecular weight (U.S. 3,172,892); about 0.1 to 2.5 weight percent of phenyl alpha naphthylamine, about 0.1 to 5 weight percent of an oil concentrate containing about 50% of zinc di(nonyphenoxyethyl) dithiophosphate and from about 0.01 to 5 weight percent of the substituted aspartamide of the invention.

The frictional effects of the substituted aspartamide additive of the invention in a mineral lubricating oil was determined in the Low Velocity Fricton Test and in the Drexron Low Energy Cycling Test (T–12). The Low Velociy Friction Test was conducted using a General Motors type fricton surface, namely a test plate identical in composition to Borg Warner's SD–715 clutch plates, in sliding contact with steel. The coefficient of friction were determined at decreasing sliding speeds, i.e. at about 40 ft./min. and at about 1 ft./min. The test temperature was 250° F. and the applied load was 120 p.s.i.

In the Low Velocity Friction Test, the friction modifier was added to a formulated base oil, designated Base Oil A, in a concentration of 0.1 weight percent to give a fully formulated automatic transmission fluid. Base Oil A, or the balance of the fully formulated transmission fluid less the friction modifier consisted of:

| Composition: | Wt. percent |
|---|---|
| Paraffin base distillate, SUS at 100° F. of 100 | 60.5 |
| Naphthenic base distillate, SUS at 100° F. of 60 | 20.0 |
| Paraffin base residuum, SUS at 210° F. of 160 | 10.0 |
| Copolymer of butyl, lauryl, stearyl and dimethylaminoethyl methacrylates | 4.0 |
| Alkenyl (1100 mol. wt.) succinic acid tetraethylenepentamine reaction product | 3.90 |
| Diethyl tert.-dioctyldiphenylamine | 0.60 |
| Zinc dialkylphenoxyethyldithiophosphate | 0.90 |

TABLE I

| Run | Base oil A plus 0.1 wt. percent of additive | Coefficient of friction sliding velocity, ft./min. | |
|---|---|---|---|
| | | 40 ft./min. | Approx. 1.0 ft./min. |
| 1 | Base oil A | 0.155 | 0.161 |
| 2 | Base oil A plus N,N'-di-($C_{14}$-$C_{20}$ sec. alkyl) aspartamide. | 0.159 | 0.153 |
| 3 | Base oil A plus N,N'-di-($C_{11}$ alkyl) aspartamide. | 0.141 | 0.133 |
| 4 | Base oil A plus N-n-oleyl N'-t-$C_{18}$-$_{24}$ aspartamide. | 0.153 | 0.181 |
| 5 | N,N'-di($C_{15-20}$ sec. alkyl)$\beta$-methyl aspartamide. | 0.143 | 0.153 |
| 6 | N,N,N',N'-tetrasoya aspartamide | 0.166 | 0.172 |

Runs 2 and 3 are illustrative of the present invention, the fluids exhibiting a substantially reduced coefficient of friction in the Low Velocity Friction Test as the sliding Velocity approaches zero. In contrast, fluids containing branched-chain aspartamides, Runs 4 to 6, caused an increase in the coefficient of friction under the same conditions.

The lubricating oil composition of the invention were tested in standard industry tests for automatic transmission fluids. The friction stable life of the transmission fluids was determined in a high energy cycling test hereinafter referred to as the Dexron Powerglide T-13 Test and in a low energy cycling test known as the Dexron Powerglide T-12 Test.

The Dexron Powerglide T-13 Test, with minor variations, is described in the General Motors Dexron Automatic transmission Fluid Specifications issued April 1967. This test is conducted using Chevrolet engine with its corresponding Powerglide transmission mounted on a test stand in such a manner that the power output is absorbed by a Dynamatic 1519 eddy current dynamometer and an auxiliary inertia wheel increasing total system inertia to 17.54 lb.-ft./sec.². This system gives acceleration rates approximating vehicle level road values.

The fluid under test is used to fill the Powerglide transmission and it is tested by running the engine and transmission in a continuous series of 90 second cycles each consisting of four phases as follows: acceleration for 13.8 seconds open throttle power with upshift occurring at approximately 12-13 seconds after start, deceleration for 8.3 seconds power off (closed throttle) coast down in the top gear (no downshift), acceleration for 9.0 seconds power on (immediate forced kickdown to low), followed by an up-shift approximately 9 seconds after start, and deceleration for 58.3 seconds power off. This test is conducted until shift failure (excessive clutch slippage, upshift time over 0.90 second or abnormal shift). To pass this test, the transmission fluid must have a life of at least 250 hours.

An automatic transmission fluid of the invention, namely the fluid of Run 2 in Table I above, had a test life of 350 hours in the Dexron Powerglide T-13 Test. This test life represents an outstanding 40% improvement over the standard for this important test.

The low energy Dexron Powerglide T-12 Test is run while the oil is maintained at a high bulk oil temperature of about 275° F. (versus about 235° F. for the T-13 Test). It is run using a Powerglide transmission driven by a Chevrolet engine similar to the T-13 Powerglide Test except that the inertia wheel added to the dynamometer gives a total system inertia of 6.7 slug ft.². This test is described in a General Motors Dexron Automatic Transmission Fluid Specification dated April 1967. To pass this qualifying test, an automatic transmission fluid must have a test life of at least 225 hours.

The quality of shifting is determined as follows: At the time of upshift, the actual shifting is normally smoothly accomplished in about 0.4 second. After a period of essentially uniform shift time and smooth operation, the shifting becomes erratic or the shifting period begins to approach 0.8 to 0.9 second. The quality of shifting has then markedly deteriorated and the duration of smooth shifting has ended. The determination of shift smoothness is made both through its audible effect and by measurement as occasional intervals of torque changes with single cycles as clutch engagement proceeds.

The automatic transmission fluid of the invention, namely the fluid of Run 2 in Table I above, had a test life of 440 hours in the Dexron Powerglide T-12 Test. This test life represents a remarkable approximately 100% improvement over the standard set for this test.

We claim:

1. An automatic transmission fluid composition comprising at least 86 weight percent of a mineral lubricating oil, from about 0.1 to 5.0 weight percent of an ashless dispersant which is the reaction product of a succinic compound and a polyethylene polyamine, said succinic compound being represented by the formula:

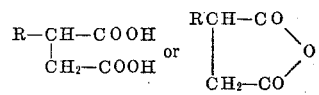

in which R is a substantially aliphatic hydrocarbon radical having from about 50 to 200 carbon atoms and said polyethylene polyamine is selected from the group consisting of diethylene triamine, triethylene tetramine and tetraethylene pentamine, and from about 0.01 to 5.0 weight percent of a substituted aspartamide represented by the formula:

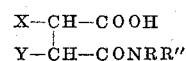

in which X and Y alternately represent hydrogen and the radical R'R''N—, R and R' each represent an alkyl or alkenyl radical having from about 1 to 30 carbon atoms and R'' is hydrogen or an alkyl or alkenyl radical having from 1 to 30 carbon atoms.

2. An automatic transmission fluid composition according to claim 1 in which R and R' are alkyl or alkenyl atoms having from about 8 to 20 carbon atoms.

3. An automatic transmission fluid composition according to claim 1 in which said substituted aspartamide is N,N'-di-($C_{14}$-$C_{20}$ sec. alkyl) aspartamide.

4. An automatic transmission fluid composition according to claim 1 in which said substituted aspartamide is N,N'-di-($C_{11}$ alkyl) aspartamide.

5. An automatic transmission fluid composition according to claim 1 in which said substituted aspartamide is N,N'-di-(n-dedecyl) aspartamide.

6. An automatic transmission fluid composition according to claim 1 in which said substituted aspartamide is N,N'-di-(oleyl) aspartamide.

7. An automatic transmission fluid composition according to claim 1 in which said substituted aspartamide is N,N'-di-(coco) aspartamide.

8. A method for operating an automatic transmission which comprises supplying to said transmission a lubricating oil composition comprising at least 86 weight percent of an ashless lubricating oil from about 0.1 to 5.0 weight percent of an ashless dispersant which is the reaction product of a succinic compound and a polyethylene polyamide, said succinic compound being represented by the formula:

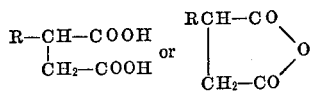

in which R is a substantially aliphatic hydrocarbon radical having from about 50 to 200 carbon atoms and said polyethylene polyamine is selected from the group consisting of diethylene triamine, triethylene tetramine and tetraethylene pentamine, and from about 0.01 to 5.0 weight percent of a substituted aspartamide represented by the formula:

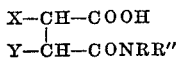

in which X and Y alternately represent hydrogen and the radical R'R''N—, R and R' each represent an alkyl or alkenyl radical having from about 1 to 30 carbon atoms and R'' is hydrogen or an alkyl or alkenyl radical having from 1 to 30 carbon atoms.

References Cited
UNITED STATES PATENTS 2,977,309  3/1961  Godfrey et al. _____ 252—51.5
3,172,892  3/1965  Le Suer et al. _____ 260—326.5

LEON D. ROSDOL, Primary Examiner

H. A. PITLICK, Assistant Examiner

U.S. Cl. X.R.

252—51.5 A